UNITED STATES PATENT OFFICE.

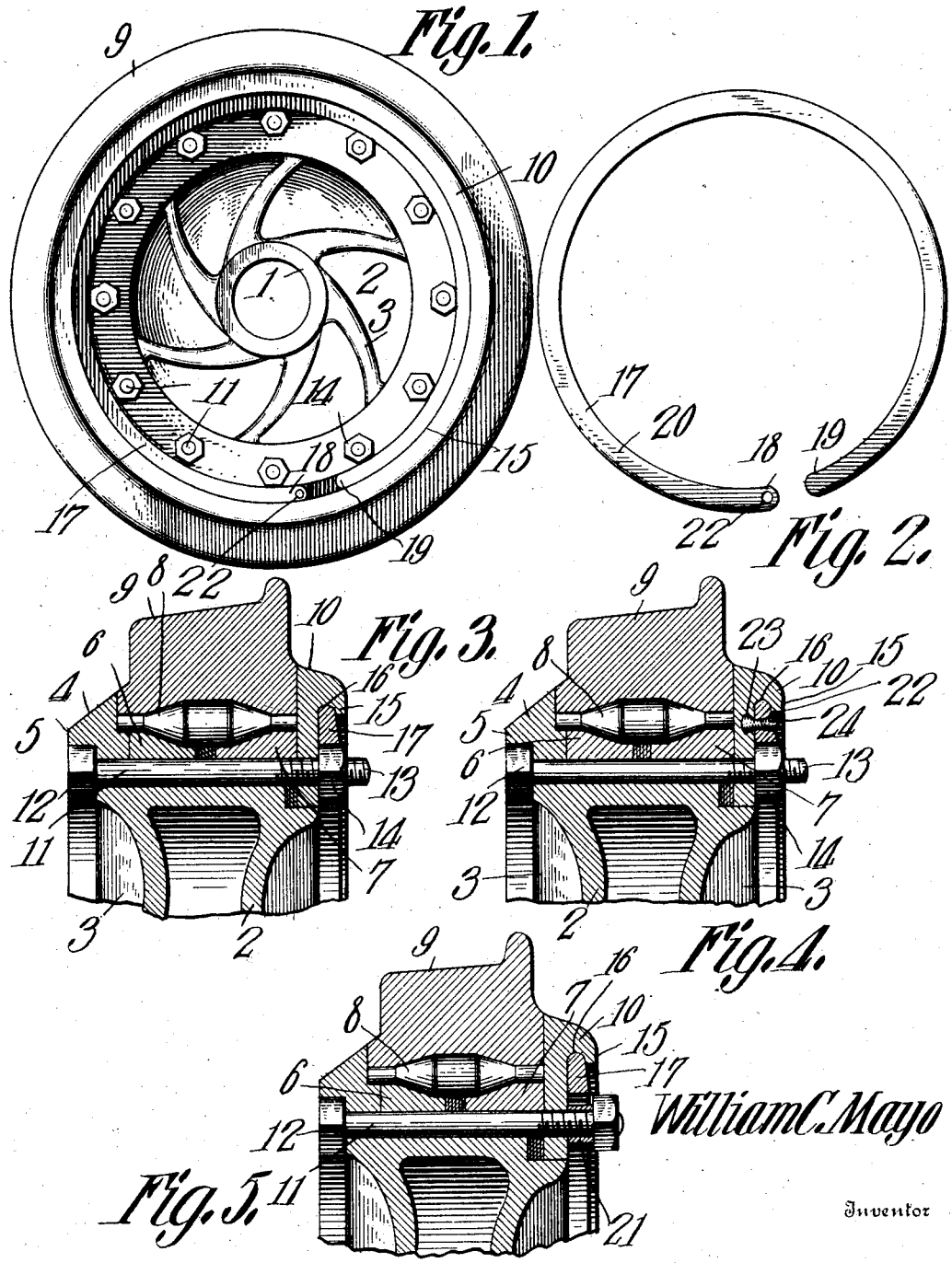

WILLIAM C. MAYO, OF EL PASO, TEXAS, ASSIGNOR OF ONE-THIRD TO GEORGE E. BRIGGS, OF BARSTOW, TEXAS, AND ONE-THIRD TO JOHN HOULEHAN, OF EL PASO, TEXAS.

NUT-LOCK.

No. 879,290.  Specification of Letters Patent.  Patented Feb. 18, 1908.

Application filed September 12, 1907. Serial No. 392,589.

*To all whom it may concern:*

Be it known that I, WILLIAM C. MAYO, a citizen of the United States, residing at El Paso, in the county of El Paso and State of Texas, have invented a new and useful Nut-Lock, of which the following is a specification.

This invention has reference to improvements in nut locks designed more particularly for use in connection with car wheels such, for instance, as shown and described in the application of John Houlehan and myself, No. 372,338, filed May 7, 1907, in which application is shown a composite car wheel wherein the rim is rotatable with reference to the body or web of the wheel, upon anti-friction bearings, and the parts are held together by bolts the nuts of which must needs for safety be securely held against unscrewing, which latter condition would result either in the parts of the wheel loosening or the wheel becoming dismantled.

While the present invention is applicable to the locking of any series of nuts wherever located, still it is particularly adaptable for use in our complete traction system, of which this invention forms an integral part.

By the present invention the several nuts are held from turning on the bolts by a split ring having a seat in a portion of the wheel, and this ring is so arranged that the nuts may be readily screwed home, after which the ring is brought successively into engagement with the nuts and it may be finally locked in place in so permanent a manner that it cannot be removed except by design. The split ring is provided with a peripheral seat exterior to the nuts and the inner edge of the ring is arranged in engagement with the corresponding face of each nut, so that the latter cannot turn upon the bolt, while the bolt itself is also held from turning. However, the two ends of the ring are located sufficiently apart to permit a nut opposite the open portion of the ring to be turned without engaging the ring, after which the ring is rotated a sufficient distance to bring the spaced ends opposite another nut and the latter is screwed home, and the spaced ends of the ring are brought opposite a third nut, and so on until all the nuts have been tightened to the desired extent. Now the ring may be locked in place and the nuts loosened just sufficiently to cramp against the ring, when the whole structure will be held rigidly in place without danger of the nuts loosening or unscrewing from the bolts.

The invention will be best understood by a consideration of the following description, taken in connection with the accompanying drawings forming part of this specification, in which,—

Figure 1 is a face view of the flanged side of a car wheel, with the improved nut lock applied thereto; Fig. 2 is a view of the split ring removed from the wheel; Fig. 3 is a cross section of a portion of the wheel, showing the locking ring in place; Fig. 4 is a cross section of the wheel at the point where the split ring is secured to the wheel or part carrying the same; and Fig. 5 is a cross section of the wheel, showing it during the process of assembling.

Referring to the drawings, there is shown a car wheel composed of a hub 1, a web 2 provided with strengthening ribs 3, and this web is continued radially outward to form a flange 4 having a lateral extension 5 to be hereinafter referred to. The peripheral face of the web section carries two annuli 6—7 shaped to receive rollers 8 on which rides the rim section 9 of the wheel. This rim section, together with the rollers and annuli 6—7, is held in place by an annular cheek plate 10, which cheek plate is secured in place by a series of bolts 11, the heads 12 of which engage under the extension 5 of the flange 4 in such manner as to be locked against turning by said extension. The other ends 13 of the bolts are threaded and extend through the cheek plate 10 and receive nuts 14 which when brought to bear against the cheek plate 10 hold the several parts of the wheel in position.

The several parts of the wheel aside from those directly connected with the nut lock form no part of the present invention and are fully shown and described in the aforesaid application; therefore, it is deemed unnecessary to describe such parts herein in greater detail than has already been done.

The cheek plate 10 is provided near its outer periphery, on the side away from the wheel body, with an overhanging, radially inwardly extending flange 15, spaced away from the cheek plate 10 to form an annular seat 16 to be later referred to.

There is provided a ring 17, split at one point in its circumference to form two contiguous ends 18—19 separated a short distance one from the other. This ring is slightly tapered in cross section, with its outer periphery rounded as indicated and adapted to enter the seat 16, which is also rounded and shaped to receive said ring quite snugly. In fact, the seat may be so shaped that the ring must be forced with some pressure thereinto in order to seat firmly. Now, the ring may be placed in its seat 16 with its inner peripheral edge 20 adjacent to but spaced a short distance from the threaded ends of the bolts, under the assumption that the nuts have not yet been applied.

By placing short sleeves 21 upon the threaded ends of the bolts the nuts 14 may be screwed upon the bolts and against the sleeves to assemble the several parts of the wheel in the desired position in order that all necessary adjustments may be made before the nuts are finally locked. When this is accomplished one of the nuts may be removed and the sleeve 21 taken off the bolt end 13, after which the ring 17 may be moved circumferentially until the space between the ends 18 and 19 is coincident with the bolt from which the nut has been removed. Now, the nut may be replaced and screwed down against the cheek plate 10 as tight as desired, being free to turn because of the space between the ends 18 and 19 of the ring 17. By rotating the ring sufficiently to bring the opening between the ends 18 and 19 opposite the next bolt in order, the nut 14 and sleeve 21 thereon may be removed and the nut be then replaced and screwed down against the cheek plate 10. So the ring may be rotated step by step and the bolts all be seated against the cheek plate 10, as will be readily understood.

The radial diameter of the ring 17 is such that when in the seat 16, but still free to be rotated, the inner peripheral edge 20 will bear against the corresponding faces of the nuts 14, which nuts, of course, are of polygonal shape. When all the nuts have been properly screwed into contact with the cheek plate 10 the ring 17 is moved in such manner that a taper hole 22 through one of the ends, say the end 18, is brought into coincidence with a taper recess 23 in the cheek plate, the tapers, however, being in opposite directions. That is, the smaller end of the recess 23 is coincident with the face of the cheek plate 10, while the smaller end of the hole 22 is on that face of the ring 17 which lies against the cheek plate. If, now, a pin 24 of some metal such as soft steel, iron, copper, or lead be inserted through the hole 22 and into the recess 23 and then swaged or riveted it will expand into the hole and recess and become thoroughly secured therein.

The inner periphery 20 of the ring 17 is such as to just about engage the corresponding faces of the nuts 14, and because the ring can be made to expand slightly into the seat 16 the nuts may be unscrewed to a very slight extent so as to cause the ring to cramp firmly into its seat.

The tendency of the nuts, under the stress of use, is to unscrew from the bolts. The heads of the bolts, however, are seated against the flange 5, and, therefore, the bolts themselves cannot turn, but the nuts cannot turn either because of the locking action of the ring 17.

It is to be understood that it is not absolutely essential to employ the pin 24 to prevent the ring from turning, since the cramping action of the ring in its seat will usually be sufficient for the purpose, but the pin may be used as a precautionary measure. Nor is the use of the nut lock restricted to the particular type of wheel shown, since it may be used on other types of wheels and, in fact, may be used upon any structure whatsoever to which it may be adapted, and such changes as may be necessary to adapt the invention to other structures than that shown are, of course, included within the scope of the invention, so long as there is no departure from the spirit of said invention. Furthermore, the ring is of such normal diameter that it is necessary to slightly contract it in order to pass it under the flange 15, and the ring is then sufficiently elastic to expand into the seat 16, and this in itself will in most cases be sufficient to maintain the ring firmly in place.

Instead of the pin 24 some other fastening means may be used, but the riveted or swaged pin answers the purpose admirably and is easily drilled out when it is desired to loosen the ring so as to be moved circumferentially to permit the unscrewing of the nuts, which is necessary when it is desired to place a new tire or rim section on the wheel or when it is desired to make adjustments for wear.

I claim:—

1. A nut lock comprising a split ring and an outer peripheral seat for the ring formed on the member held by the nuts, the ring, when in the seat, having its inner edge in close relation to the nuts.

2. A nut lock comprising an element engaged by a series of nuts, an incomplete ring on said element having its ends spaced apart and its inner face in close relation to the nuts, and means on the element for preventing the expansion of the ring when in operative relation to the nuts.

3. A nut lock comprising a split ring having its inner edge in close relation to the nuts and its ends contiguous but sufficiently spaced to permit the nuts to be turned, and means for preventing the radial expansion of the ring when in operative relation to the nuts.

4. A nut lock comprising a split ring having its inner edge in close relation to the nuts and its ends contiguous but sufficiently spaced to permit the nuts to be turned, and means for preventing the ring from expanding radially outward and from moving in a plane at right angles to the radii of the ring.

5. A nut lock comprising a split ring and an outer peripheral seat for the ring formed on the member held by the nuts and in which seat the ring is rotatable, said ring, when in the seat, having its inner edge in close relation to the nuts.

6. In a nut lock, the combination with a series of nuts and a member held by said nuts, the said member having a seat formed therein, of a locking means for the nuts having one edge housed in said seat and the other edge in operative relation to the nuts, said means being movable in a direction in said seat to permit the nuts to be turned without interference and also to engage the nuts, and said means also being so related to the nuts that on unscrewing the latter the locking means will be more firmly forced into the seat.

7. A nut lock for an annular series of nuts, comprising a split ring having its contiguous ends spaced apart sufficiently to permit the turning of a nut therebetween, and a seat for the ring overhanging the outer peripheral edge thereof and shaped to permit the ring to be rotated concentric with the series of nuts.

8. A nut lock for an annular series of nuts, comprising a split ring having its contiguous ends spaced apart sufficiently to permit the turning of a nut therebetween, a seat for the ring overhanging the outer peripheral edge thereof and shaped to permit the ring to be rotated concentric with the series of nuts, and means for securing the ring in its seat against rotative movement.

9. A nut lock for an annular series of nuts, comprising a split ring having its contiguous ends spaced apart sufficiently to permit the turning of a nut therebetween, a seat for the ring overhanging the outer peripheral edge thereof and shaped to permit the ring to be rotated concentric with the series of nuts, and means for securing the ring in its seat against rotative movement, comprising a pin extending through and fitting a tapered hole in one end of the ring and an oppositely tapered recess in a fixed portion of the structure held by the nuts.

10. A nut lock for an annular series of nuts comprising a split ring of tapered cross section and an outer peripheral seat of like cross section formed on the member held by the nuts, the ring when in the seat having its inner edge in close relation to the nuts.

In testimony that I claim the foregoing as my own, I have hereto affixed my signature in the presence of two witnesses.

WILLIAM C. MAYO.

Witnesses:
MABEL O. FAHNESTOCK,
RENÉ DERJARQUY.